Nov. 28, 1961   S. WALLACK ET AL   3,011,096
ELECTRICAL TIMING CIRCUIT
Filed Nov. 9, 1955
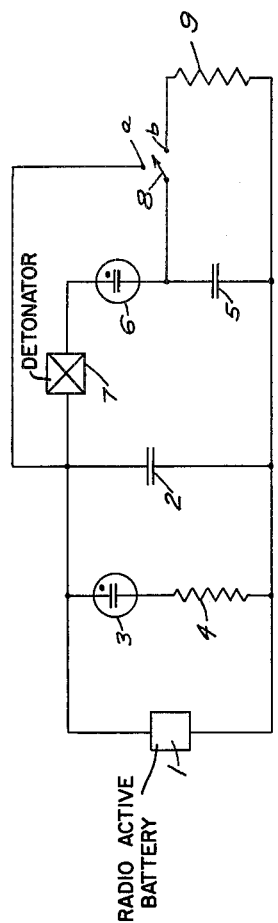
INVENTORS
Stanley Wallack
Rene J. Perdreaux, Jr.
BY

3,011,096
ELECTRICAL TIMING CIRCUIT
Stanley Wallack, Jackson Heights, and Rene J. Perdreaux, Jr., Brooklyn, N.Y., assignors, by mesne assignments, to the United States of America as represented by the Secretary of the Navy
Filed Nov. 9, 1955, Ser. No. 545,954
2 Claims. (Cl. 317—80)

This invention relates to electrical control apparatus, and in particular to timing circuitry incorporating a radioactive battery to provide a reliable control for associated equipment.

Within recent years, batteries employing radioactive elements for developing relatively high voltages at low current values have been introduced to the art. These batteries offer several advantages in operational characteristics which establish them as highly satisfactory potential sources in certain electronic and electrical applications. For example, radioactive batteries have a shelf life of the order of 25 years, do not contain any moving parts, are independent of ambient conditions, and can be economically fabricated in miniaturized form. Moreover, the quantities of radioactive materials required for operation are small and do not constitute a health hazard, and are also readily available as by-products of pile operation.

In view of the fact that the electrical characteristics of these batteries are in many aspects unique and not directly comparable to other types of electrical generators in the art, appropriate circuit design for a particular application must necessarily be adapted to the properties of radioactive batteries.

The present invention features an electrical control device incorporating in a preferred embodiment a radioactive battery as the necessary energy source to effect circuit operation. The circuitry is uniquely adapted to the characteristics of a radioactive battery so that an exceedingly accurate timing control can be provided. This device can be advantageously employed, for example, to arm or detonate demolition devices such as projectiles and mines after a required delay time interval.

A principal object of this invention is to provide a relatively short interval timer operative to control associated equipment with a high degree of reproducibility for interval timing in a range extending from a fraction of a second to several hours.

Another object of this invention is to provide a timing control device which may be easily and economically fabricated in a durable miniaturized form with a self-contained, permanent energizing source.

Another object of this invention is to provide a timing control circuit having an output which is independent of ambient temperature within the range of from approximately minus 65 degrees Fahrenheit to plus 165 degrees Fahrenheit.

Another object of this invention is to provide a timing control device which may be readily tested as to operability and timing interval prior to use.

A preferred embodiment of this invention contemplates a timing network which is particularly adapted to be energized by a voltage-regulated power supply employing a radioactive battery as the source of energy. During the preparation of the timing circuitry for a control operation, the output of this power supply is connected to charge a capacitor of the timing network to the regulated potential of the power supply.

When a timing interval is initiated, a switch included in the charging circuitry for the capacitor of the timing network is operated so as to discharge this capacitor through a resistor. A gas diode and the device under control are serially connected between the output of the power supply and the timing capacitor, and therefore an operative point is reached during the timed discharge of this capacitor at which the firing potential of the gas tube will be attained. With this occurrence, the substantial resulting current flow actuates the device under control producing the desired event after an accurately timed interval.

In order that all of the features for attaining the objects of this invention may be readily understood, detailed reference is herein made to the accompanying drawing wherein a schematic circuit diagram of a preferred embodiment of the control apparatus of this invention is shown.

Referring now to the drawing, battery 1 is a radioactive battery providing a high-voltage output of the order of several thousands of volts at low current. The output potential of a radioactive battery is generated from the electrical energy associated with charged particles that are emitted by a local source of radioactive material. In general, this is accomplished by placing a collector electrode or electrodes adjacent the supply of radioactive material to collect the charge particles, thereby developing an electrical potential between the radioactive material and the collector electrode. Battery 1 may correspond in construction to the batteries disclosed in the copending application of H. C. Lieb and E. J. Dziedziula Serial No. 470,565, filed November 23, 1954, now Patent No. 2,774,891. Other constructions are also disclosed in U.S. Patents 2,517,120, 2,552,050 and 2,555,143, all issued to E. G. Linder on August 1, 1950, May 8, 1951, and May 29, 1951, respectively.

The output of battery 1 is directly shunted by capacitor 2, and battery 1 and capacitor 2 are directly shunted by serially-connected gas diode 3 and resistor 4. Radioactive battery 1 is incapable of supplying a relatively large current at a constant voltage and therefore components 2, 3 and 4 are connected across the battery in order to apply a potential to the associated circuitry which is limited as to maximum amplitude. In particular, radioactive battery 1 supplies energy at a very low current level to charge capacitor 2. As the potential across battery 1 and capacitor 2 builds up and approaches the firing potential of gas diode 3, the resistance of the diode decreases sufficiently to permit a minute flow of current to pass through diode 3 and resistor 4. Resistor 4 has a very high resistance value, preferably of the order of several megohms, in order to prevent the firing of diode 3 and to maintain the diode at approximately the threshold of the firing point. As a result of the minute flow of current, the voltage across battery 1, capacitor 2, and serially connected diode 3 and resistor 4 attains equilibrium at a value below the firing voltage of the diode. Voltage regulation is attained because any incremental increase in battery potential will merely tend to cause an increased flow of current through diode 3 and resistor 4 which prevents any further increase in output potential.

The output of the power supply appearing across capacitor 2 is shunted by serially-connected capacitor 5, gas diode 6 and the operating circuitry of the device 7 which is under time control. The movable arm of switch 8 is directly connected to the common junction terminal for capacitor 5 and gas diode 6. When switch 8 is operated to switch position *a*, gas tube 6 and device 7 are shorted and capacitors 2 and 5 are connected in parallel with respect to one another. When switch 8 is operated to switch position *b*, resistor 9 is connected so as to shunt capacitor 5.

The detailed operation of the foregoing timing control circuitry to operate device 7 after an accurately timed interval is as follows:

During storage or non-use of the timing unit, switch 8 is fixed at position *a*. While in this position, the regulated power supply will maintain capacitors 2 and 5 at the regulated equilibrium potential determined by gas diode 3. Inasmuch as the charge potentials appearing across capacitors 2 and 5 are equally and oppositely directed with respect to the circuit loop including gas diode 6 and device 7, a zero potential appears across the diode which is, of course, ineffectual to fire this tube, and accordingly, there is no current flow through device 7.

When switch 8 is thrown to position b, capacitor 5 discharges through resistor 9 at a rate determined by the discharge time constant $C_5R_9$. It should be noted that gas tube 6 is not ionized at this time, and therefore the circuit branch including the gas tube has very little effect on the discharge time constant.

When capacitor 5 discharges sufficiently so that the difference in potential between capacitor 2 and capacitor 5 equals the firing potential of gas tube 6, the tube breaks down and causes a substantial current surge to pass through device 7 which operates the device.

Timing tests of the disclosed circuit have been conducted with the following results:

$C_5 = 5000$ mmf.
$R_9 = .97 \times 10^{11}$ ohms

| Run No.: | Time (seconds) |
|---|---|
| 1 | 566 |
| 2 | 568 |
| 3 | 570 |
| 4 | 566 |
| 5 | 568 |
| 6 | 570 |
| 7 | 547 |

Average deviation 0.26%
$C_5 = 5000$ mmf.
$R_9 = 0.93 \times 10^{12}$ ohms

| Run No.: | Time (seconds) |
|---|---|
| 1 | 5200 |
| 2 | 5160 |
| 3 | 4962 |
| 4 | 5162 |
| 5 | 5145 |
| 6 | 5088 |

Average deviation 1.1%

As established by the above data, the subject circuit is capable of operating with a high degree of reproducibility in interval timing.

It is to be understood that the above-described arrangement is illustrative of the application of the principles of this invention. Numerous other arrangements may be devised by those skilled in the art without departing from the scope of the invention.

Having thus described the invention what is claimed as new and desired to be secured by Letters Patent is:

1. A timing circuit for a detonating device consisting of a radioactivity battery having a high potential output of at least two thousand volts, a voltage regulator means shunted across said radio battery, said voltage regulator including a gas diode and a resistor having a high resistance selected to limit the high potential applied to said gas diode at the threshold of the gaseous breakdown, a filter capacitor continuously connected in parallel with said voltage regulator means and continuously energized to a predetermined fixed potential by said radio-active battery, said filter capacitor being connected in a closed loop, an electroresponsive detonating means, a voltage responsive gas diode, a switching means having a first and second switching position and a timing capacitor each respectively connected in series with said filter capacitor in said loop, a shunting circuit for by-passing the electroresponsive detonating means and the voltage responsive gas diode connecting the filter capacitor with the timing capacitor when the switching means is in said first switching position thereby charging the filter capacitor and timing capacitor to said predetermined fixed potential and providing a potential across said gas diode of zero, a timing resistor electrically connected across said timing capacitor when the switching means is in said second position, said resistor being of a high resistance and causing said timing capacitor to be discharged at a predetermined rate, a potential being developed across said gas diode at the same rate as said timing capacitor is discharged whereby when the voltage potential reaches a breakdown potential after a precise interval the gas diode is fired causing a current surge through said closed loop for activating the electroresponsive detonator.

2. A timing control circuit for actuating a detonating device after a precise time interval consisting of a radioactive battery having a high potential output, a first series circuit including a gas diode and resistor shunting the output of said radioactive battery, said resistor having a high resistance value selected to limit the high potential applied to said gas diode at the threshold of the gaseous breakdown, a filter capacitor permanently connected in parallel with said radioactive battery and said first series circuit for storing the high potential energy output of said radioactive battery, electroresponsive detonating means, a second series circuit including said electroresponsive detonating means, a gas diode, a switching means having a first and second circuit connector position and a timing capacitor, each respectively, connected in series with said filter capacitor, a first branch circuit including said switching means in the first circuit connector position connecting the filter capacitor to said timing capacitor and by-passing said electroresponsive detonating means and gas diode thereby providing a zero voltage potential across said gas diode, a second branch circuit including said switching means in the second circuit connector position connecting a timing resistor across said timing capacitor thereby opening said first branch circuit as the switching means is switched from said first circuit connector position, whereby the potential on the said timing capacitor is reduced at a predetermined rate and the potential across the gas diode progressively builds up at said predetermined rate until the gas tube fires actuating the electroresponsive detonating means.

References Cited in the file of this patent

UNITED STATES PATENTS

| 2,404,553 | Wales | July 23, 1946 |
| 2,545,474 | Kurland | Mar. 20, 1951 |
| 2,576,100 | Brown | Nov. 27, 1951 |
| 2,620,446 | Le Vine | Dec. 2, 1952 |
| 2,658,141 | Kurland et al. | Nov. 3, 1953 |
| 2,661,431 | Linder | Dec. 1, 1953 |

FOREIGN PATENTS

| 549,998 | Great Britain | Dec. 17, 1942 |